June 9, 1959  F. J. CID  2,890,430
LIQUID LEVEL CURRENT CONTROL DEVICE
Filed April 26, 1956
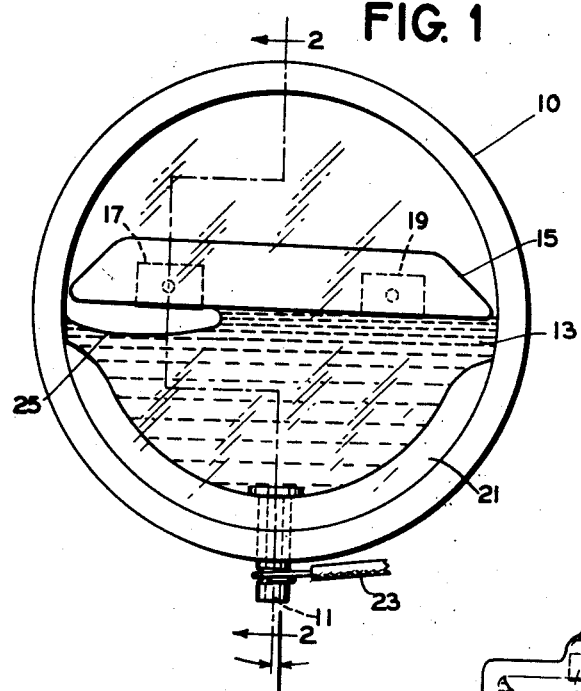
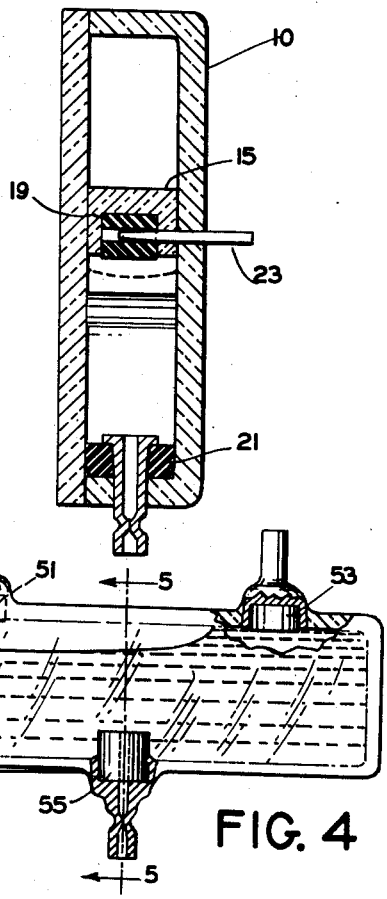
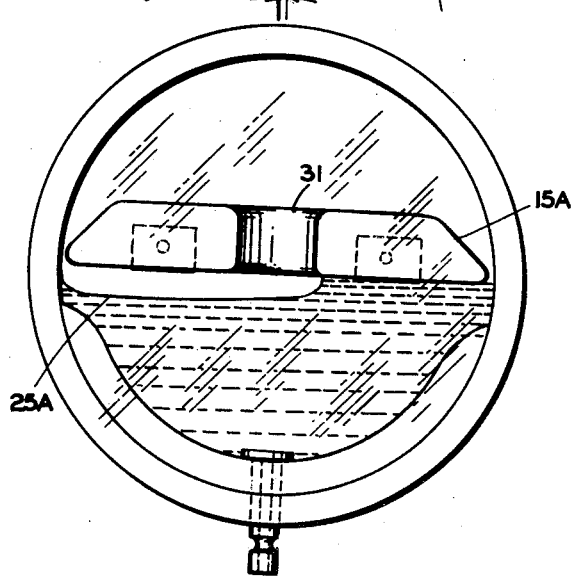
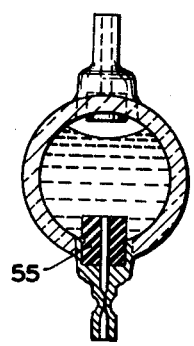
INVENTOR.
FRED JEAN CID
BY
*Oscar B. Brumback*
ATTORNEY United States Patent Office 2,890,430
Patented June 9, 1959

2,890,430

LIQUID LEVEL CURRENT CONTROL DEVICE

Fred Jean Cid, Lodi, N.J., assignor to Bendix Aviation Corporation, Teterboro, N.J., a corporation of Delaware Application April 26, 1956, Serial No. 580,741

11 Claims. (Cl. 338—44)

The present invention relates to current control devices and more particularly to liquid level current control devices and is a continuation-in-part of my copending application, Ser. No. 576,446, filed April 6, 1956, and now U.S. Patent No. 2,852,645, granted September 16, 1958, and assigned to Bendix Aviation Corporation.

The container of the heretofore known liquid level current control devices, such as those used in the erection system for gyroscopes, has been hermetically sealed after being partially filled with electrolyte so as to leave an air bubble at the top and has had an electrode at the bottom and at least a pair of spaced electrodes near the top. The bottom electrode always has a large area in contact with the electrolyte, and the top pair of electrodes normally have equal areas in contact with the electrolyte. The latter areas, however, are variable; both areas small at the normal level position of the container so as to offer a great resistance to the flow of electricity between the top and bottom electrodes, but the area of contact of one top electrode with the electrolyte becoming greater as the container is tilted so that the resistance to the flow of electric current is reduced and a greater current flow results. This change in resistance may be utilized for example, in the control of the erection motors of a gyro.

The difficulty experienced with such heretofore known liquid level current control devices has been that the chemical, physical, and electrical properties of the substances involved have limited the operating life of the device and the power that it could transmit. The current control device, for example, requires an electrode-electrolyte relationship providing a variable contact surface conductivity to function properly since the current control devices are "tilt-angle" devices and not "make and break" devices. Due to this requirement, therefore, it was believed that only a metal could be used for the electrode.

The metal electrodes presented problems with the electrolyte. Liquid metallic conductors such as mercury alloys were not suitable for the sensitivity required; aqueous solutions would freeze at the temperatures to which aircraft are subjected; and organic liquid had too great an electrical resistance. Accordingly, the choice of electrolyte was limited to certain types of ionizing salts dissolved in an organic medium. Since these electrolytes tend to corrode the common metals such as copper, it has been necessary to use electrodes of relatively inert metals such as platinum. However, even these metals corrode under high current and the electrolyte exhibits a tendency to decompose.

The electrode-electrolyte contact area is small. Thus, the greater the amount of power transmitted by the current control device, the greater the tendency is for the device to become heated. The resulting higher operating temperature hastens the decomposition process; and as the electrodes become coated with decomposition products, they change in resistance and the current control device loses its sensitivity. To make the contacts larger to avoid the heating increases the cost, size, and weight of the unit.

An object of the present invention, therefore, is to provide a liquid level current control device having a long operating life.

Another object is to provide a liquid level current control device with non-metallic electrodes.

Still another object is to provide a liquid level current control device having electrodes, which are non-corrosive and inert to the electrolyte so that no deterioration of the electrode or change in resistance occurs with operation of the device.

A further object in to provide a liquid level current control device having electrodes of an inherently porous material whereby the presence of electrolyte in the electrode increases the conductivity of the electrode.

A still further object is to provide a liquid level current control device with carbon electrodes.

The present invention contemplates the provision of carbon electrodes in a current control device of the liquid level type wherein a sealed housing is partially filled with electrolyte so that an electrode at the bottom is always in contact with the electrolyte and a pair of electrodes at the top have equal sized small portions of surface area exposed to the electrolyte at a level junction and unequal sized portions exposed upon a tilting of the housing.

I have discovered that after long intervals of operating time of current control devices with carbon electrodes such as contemplated by the present invention, no deterioration of the electrolyte nor any change in the resistance of the contact occurs. The carbon electrodes permit a large controlled current to be passed without increasing the size of the current control device and since the carbon is inherently porous, a volume in which the electrolyte may make contact is permitted, thus giving better proportionality to the liquid level current control device.

The foregoing and other objects and advantages of the invention will appear more fully hereinafter from a consideration of the detailed description which follows, taken together with the accompanying drawing wherein three embodiments of the invention are illustrated by way of example. It is to be expressly understood, however, that the drawing is for illustration purposes only and is not to be construed as defining the limits of the invention.

In the single sheet of drawings wherein like parts are marked alike:

Figure 1 is an elevational view of the novel current control devices of the present invention;

Figure 2 is a sectional view taken along lines 2—2 of Figure 1;

Figure 3 is an elevational view of another embodiment of the invention;

Figure 4 is an elevational view of a further embodiment of the invention; and

Figure 5 is a sectional view of Figure 4 taken along lines 5—5.

Turning now to Fig. 1 a circular glass housing 10 is by way of filling tube 11 partially filled with a suitable electrolyte so as to leave an air bubble at the top and hermetically sealed by crimping the tube. I have found a suitable electrolyte 13 to be a solution of one half gram of sodium iodide in forty grams of methyl alcohol.

A bridge 15 is fixed to housing 10 near the top of the housing and includes two electrodes 17 and 19 of carbon. At the bottom of the housing is a third electrode 21 also of carbon. Suitable electrical connections 23 provide for the energization of the electrodes.

At the normal position of the housing 10, the ends of the meniscus 25 barely engage the surfaces of electrodes 17 and 19, and a high impedance is presented to the flow of current between the upper electrodes 17, 19 and the lower electrode 21. Upon a tilting of housing 10 more of one surface of electrode 17 or 19 is exposed to the electrolyte and less of the other electrode surface. The increase in exposed surface area lowers the impedance to current flow so that a greater amount of current flows between a top and bottom electrode. This increase and decrease in current flow may be used to operate the erection motors, for example, of a vertical gyro to maintain the gyro in an erect position. In the gyro erection system it is desirable to know whether the gyro is erect or not so that a contact with a high impedance at the vertical position and a low impedance immediately off vertical is desirable. Carbon being inherently porous becomes saturated with the electrolyte as soon as the housing is tilted so that the impedance is low once the gyro is off vertical. Further, due to this porosity a greater volume of electrolyte is brought in contact with the electrode so as to maintain the resistance at a low value.

Fig. 3 illustrates another embodiment of the present invention. The bridge member 15A is slotted at 31 to provide for the rapid drainage of the electrolyte from the top of the bridge in the event the housing be tilted far enough to have liquid reach the top of the bridge and then brought back to level. The aperture portion 31 also presents a restraint on the meniscus 25A so as to keep the one electrode immediately above the meniscus 25A from becoming wetted and to provide a complete current break, although the tilted angle of the housing may become great. Accordingly, in the position of the bridge member 15A, shown in Figure 3, the hole 31 breaks the surface of the film of electrolyte at the meniscus 25A of the measuring air bubble so as to effect a complete current break between the bridge contact immediately above the meniscus 25A and the current conducting electrolyte.

Moreover, upon a rapid angular positioning of the housing, the opening 31 in the bridge member 15A facilitates the redistribution of the electrolytic fluid from the upper to the lower portions of the housing through the opening 31 so that the center of gravity of the fluid remains more nearly aligned at all times along the acceleration vector through the axis of support of the housing.

It has been further observed that the presence of the hole 31 in the bridge member 15A tends to hold or retard the meniscus 25A or air bubble from transitory fluctuations in the liquid surface of the electrolyte under conditions of rapid angular positioning of the housing. Such damping effect may be attributed to a tendency of the air bubble in the surface of the electrolyte to rise in the opening 31 toward the gaseous region above the bridge member 15A and electrolyte. This embodiment aside from the feature of the aperture portion 31 operates similar to the embodiment of Figure 1.

Fig. 4 is another embodiment of the invention wherein the envelope is a tubular member having two spaced electrodes 51, 53 at the top and a third electrode 55 at the bottom. The tube is hermetically sealed after being partially filled with an electrolyte so as to leave a bubble at the top. Inasmuch as it is difficult to weld the piece of carbon to the glass the carbon is held in a metal container 55 and the container welded to the glass. This liquid level current control device also operates in a manner similar to that described above for Figure 1.

The foregoing has presented a novel liquid level current control device wherein the electrodes are made of an inert, porous and non-metallic elements which will not react with the electrolyte; thus the current control device has an extended operating life without a breakdown of the electrolyte or a change in resistance of the electrodes. Further, due to the nature of the electrodes a much larger amount of current and power may be transmitted by the current control device without undue heating of the device.

While three embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A device comprising a tiltable housing, an ionizing salt electrolyte partially filling said housing, carbon electrodes inert to said electrolyte and spaced near the top and bottom of the housing, the carbon electrode near the top having normally a relatively high electrical resistance and a porous surface portion in variable contact with the electrolyte dependent upon the tilting of the housing, and said porous surface portion being saturated by said electrolyte upon a tilting of the housing in one sense so as to reduce the electrical resistance thereof to a relatively low value.

2. A device comprising a tiltable housing, an ionizing salt electrolyte partially filling said housing, and carbon electrodes inert to said electrolyte and spaced near the top and bottom of the housing, the electrode near the top having normally a relatively high electrical resistance and a porous surface portion in variable contact with the electrolyte dependent upon the tilting of the housing, said electrolyte comprising a solution of sodium iodide in methyl alcohol, and said porous surface portion being saturated by said electrolyte upon a tilting of the housing in one sense so as to reduce the electrical resistance thereof to a relatively low value.

3. A device comprising a tiltable housing, an electrolyte of a sodium iodide solution partially filling said housing, a bridge element mounted in the housing, carbon electrodes inert to the electrolyte and including a pair of carbon electrodes spaced on the bridge element near the top of the housing, and a carbon electrode at the bottom of the housing, the electrodes on the bridge element each having a porous surface area portion in variable contact with the electrolyte solution and saturable by said solution dependent upon the tilting of the housing, the bridge element being apertured between the electrodes so as to drain the bridge element of electrolyte accumulation and to hold the meniscus of the electrolyte.

4. A device comprising a tiltable tubular housing, an ionizing salt electrolyte partially filling said housing, a pair of spaced carbon electrodes inert to the electrolyte and spaced near the top of the housing, said carbon electrodes having normally a relatively high electrical resistance, and an electrode near the bottom of the housing, the electrodes near the top each having a porous surface portion in variable contact with the electrolyte depending upon the sense and extent of tilting of the housing, and the porous surface portion of one of said spaced carbon electrodes being saturated by said electrolyte upon tilting of said housing in one sense so as to reduce the electrical resistance of said one carbon electrode to a low value relative to the electrical resistance of said other carbon electrode.

5. A device comprising a tiltable housing, an electrolyte of an ionizing salt solution partially filling said housing, an electrode near the top of the housing, and an electrode near the bottom of the housing, the electrode near the top having a porous surface portion in variable contact with the electrolyte dependent upon the tilting of the housing, and said porous surface portion being saturated by said electrolyte upon a tilting of the housing in one sense so as to reduce the electrical resistance thereof to a relatively low value.

6. A device comprising a tiltable housing, an electrolyte of an ionizing salt solution partially filling said housing, an electrode near the bottom of the housing in continuous contacting relation with the electrolyte, a bridge member, carbon electrodes spaced on the bridge member and positioned near the top of the housing, each carbon electrode having a porous surface area portion in variable contact with the electrolyte, the area in contact with the electrolyte being dependent upon the extent of tilting of the housing, and the porous surface portion of each of said carbon electrodes being selectively saturated by the electrolyte relative one to the other dependent upon the sense of the tilting of he housing.

7. A tilt responsive current control device comprising a relatively straight tubular envelope adapted for tilting from a level position, a carbon electrode positioned at the bottom of said envelope, a second carbon electrode spaced above said first electrode, said electrode being adapted for connection to a source of electricity, and a current conducting ionizing salt solution in said envelope for making contact between said carbon electrode to complete a circuit from said source, said first electrode having an area continuously in contact with said ionizing salt solution and the second electrode having a porous surface area, the surface area of contact of said second electrode and said ionizing salt solution varying in accordance with the tilt of said envelope so that the porous surface area of said second electrode may be saturated by said ionizing salt solution upon a tilt of said envelope in a predetermined sense to thereby increase current conduction in said circuit from said source.

8. The combination comprising a housing tiltable in opposite senses and to a variable extent, an electrolytic liquid partially filling said housing and having an air bubble in an upper surface of the liquid, said housing having an upper inner surface and a lower inner surface, a bridge element mounted in the housing in spaced relation to the upper and lower inner surfaces of the housing and adjacent the upper surface of the liquid, a pair of electrodes spaced on the bridge element, a third electrode in the housing in continuous contacting relation with the electrolytic liquid, each of the electrodes on the bridge element having a surface area portion contactable with the electrolytic liquid for conducting electrical energy between the third electrode and at least one of the bridge element electrodes, the air bubble in the upper surface of the electrolytic liquid contacting the surface area portions of the bridge element electrodes so as to vary the surface area portions of the bridge element electrodes in contact with the electrolytic liquid dependent upon the sense and extent of tilting of the housing, and the bridge element having an aperture therein positioned intermediate said bridge element electrodes and extending through the bridge element so as to drain the bridge element of electrolytic liquid accumulation at an upper side of the bridge element and effect at an under side of the bridge element a complete break in the conduction of current by the electrolytic liquid between said third electrode and one of said bridge element electrodes dependent upon the extent and sense of tilt of said housing.

9. The combination defined by claim 8 in which said bridge element electrodes include carbon members normally having electrical resistances of relatively high value, said carbon members having porous surface areas variably contactable by the electrolytic liquid upon a tilting of the housing, the porous surface area of one of said carbon members being saturated by said electrolytic liquid upon a tilting of the housing in one selected sense, and the porous surface area of the other of said carbon members being saturated by said electrolytic liquid upon a tilting of the housing in an opposite selected sense, and the value of the electrical resistance of the carbon member having the porous surface area saturated by the electrolytic liquid being reduced to a low value relative to the normal high value of the electrical resistances of the carbon members.

10. The combination comprising a housing tiltable in opposite senses and to a variable extent, an ionizing salt electrolytic liquid partially filling said housing and having an air bubble in an upper surface of the liquid, an electrode in the housing in continuous contacting relation with the electrolyte, a pair of carbon electrodes positioned in the housing in spaced relation above the first-mentioned electrode, each of said carbon electrodes normally having an electrical resistance of relatively high value and a porous surface area portion effective upon a tilting of the housing to be variably contacted by the electrolytic liquid for conducting electrical energy between the first-mentioned electrode and at least one of said carbon electrodes, the air bubble in the upper surface of the electrolytic liquid effective to selectively contact said surface area portions of the carbon electrodes so as to vary the surface area portions of the carbon electrodes in contact with the electrolytic liquid dependent upon the sense and extent of tilting of the housing, the porous surface area portion of one of said carbon electrodes being saturated by said electrolytic liquid upon a tilting of the housing in one selected sense, and the porous surface area portion of the other of said carbon electrodes being saturated by said electrolytic liquid upon a tilting of the housing in an opposite selected sense, and the electrical resistance of the saturated carbon electrode being reduced thereby to a relatively low value.

11. The combination comprising a tiltable housing, an ionizing salt electrolyte partially filling said housing, an electrode in the housing in continuous contacting relation with the electrolyte, a carbon electrode positioned in the housing above the first-mentioned electrode, said carbon electrode having normally a relatively high electrical resistance and a porous surface portion in variable contacting relation with the electrolyte dependent upon the tilting of the housing, and said porous surface portion being saturated by said electrolyte upon a tilting of the housing in one sense so as to reduce the electrical resistance thereof to a relatively low value.

References Cited in the file of this patent

UNITED STATES PATENTS

| | | |
|---|---|---|
| 2,256,212 | Morrison | Sept. 16, 1941 |
| 2,387,313 | Wilson | Oct. 23, 1945 |
| 2,713,726 | Dixson | July 26, 1955 |
| 2,713,727 | Balsam | July 26, 1955 |
| 2,740,028 | Buckman | Mar. 27, 1956 |